Patented Jan. 5, 1937

2,066,717

UNITED STATES PATENT OFFICE 2,066,717

STABILIZED TERPENE-OXIDE PREPARATIONS

Stanislaus Deichsel, Wuppertal-Elberfeld, Germany, assignor to Winthrop Chemical Company, Inc., New York, N. Y., a corporation of New York No Drawing. Application October 18, 1934, Serial No. 748,962. In Germany October 21, 1933

18 Claims. (Cl. 23—250)

This invention relates to a composition of matter comprising a terpene-oxide, terpene-peroxide respectively, in a solution of a halogenated hydrocarbon in a stabilized form.

Solutions of terpene-oxides, particularly terpene-peroxides in halogenated hydrocarbons are decomposed to a great extent by the action of light within a short period of time. The solutions which are first neutral soon become sour. A 10% solution of ascaridol in carbon tetrachloride is for instance decomposed so quickly that after 5 hours' standing in the sun-light only about half of the ascaridol is present in an undecomposed state.

The present invention provides for a composition of matter which contains the terpene-oxides, terpene-peroxides respectively, dissolved in liquid halogenated hydrocarbons in a form which is practically insensitive to the action of light. In accordance with the present invention such stable solutions of terpene-oxides or terpene-peroxides in liquid halogenated hydrocarbons may be produced by coloring the said solutions by means of a fat-soluble dyestuff which is capable of absorbing the chemically active part of light. The said fat-soluble dyestuffs have proved to be sufficiently soluble in the liquid halogenated hydrocarbons in order to bring about the said protective effect. The yellow to red fat-soluble dyestuffs, especially those of the azo-dyestuff series, have proved particularly effective. Terpene-oxides, terpene-peroxides respectively, which may be protected in the said manner are, for instance, ascaridol, cyclohexanone peroxide, and tetrahydronaphthalene peroxide. Liquid halogenated hydrocarbons which may be used as solvent are particularly those of the aliphatic series, for instance, carbon tetrachloride, chloroform, methylchloroform, trichloroethylene, and tetrachloroethylene.

The invention is further illustrated by the following examples without being restricted thereto:

*Example 1.*—10 grams of ascaridol are dissolved in a solution of 0.5 gram of the azo dyestuff obtained from ortho-anisidine and beta-naphthol in 90 grams of carbon tetrachloride. The solution obtained is practically insensitive to light, even after being exposed to day-light for 2 years the ascaridol content of such a solution remains unchanged.

Instead of the above-named dyestuff likewise the azo dyestuff obtained from para-phenetidine and beta-naphthol, further quinophthalone and the dyestuffs prepared from tartaric acid and phenylhydrazine may be employed.

*Example 2.*—10 grams of ascaridol are dissolved in a solution of 0.3 gram of the azo dyestuff from ortho-anisidine and beta-naphthol in 60 grams of chloroform. This solution is practically insensitive to day-light, whereas a corresponding solution not containing the dyestuff is readily decomposed by light.

*Example 3.*—60 grams of ascaridol and 0.5 gram of the dyestuff from para-phenetidine and beta-naphthol are dissolved in 40 grams of trichloroethylene. A solution which is stable to light is thus obtained.

*Example 4.*—1 gram of cyclohexanone peroxide (melting at 82° C., obtained by acting upon cyclohexanone with 25% hydrogen peroxide) are dissolved in 90 grams of carbon tetrachloride with the addition of 0.5 gram of "Sudan G" (compare Color Index (1924), No. 248). A solution which is stable to light is thus obtained.

*Example 5.*—10 grams of tetrahydronaphthalene peroxide are dissolved in 90 grams of carbon tetrachloride with the addition of 0.5 gram of "Oil orange E" (compare Color Index (1924) No. 24). The solution obtained is stable to light.

*Example 6.*—10 grams of ascaridol and 0.3 gram of dragon's blood are dissolved in 90 grams of carbon tetrachloride. The solution thus obtained is stable to light.

I claim:—

1. Composition of matter comprising a terpene-oxide in solution of a liquid halogenated hydrocarbon which is colored by the content of a fat-soluble dyestuff capable of absorbing the chemically active light, which solution is practically stable to light.

2. Composition of matter comprising a terpene-peroxide in solution of a liquid halogenated hydrocarbon which is colored by the content of a fat-soluble dyestuff capable of absorbing the chemically active light, which solution is practically stable to light.

3. Composition of matter comprising a terpene-oxide in solution of a liquid halogenated hydrocarbon which is colored by the content of a fat-soluble azo-dyestuff capable of absorbing the chemically active light, which solution is practically stable to light.

4. Composition of matter comprising a terpene-peroxide in solution of a liquid halogenated hydrocarbon which is colored by the content of a fat-soluble azo-dyestuff capable of absorbing the chemically active light, which solution is practically stable to light.

5. Composition of matter comprising a terpene-oxide in solution of a liquid chlorinated hydrocarbon which is colored by the content of a fat-soluble dyestuff capable of absorbing the chemically active light, which solution is practically stable to light.

6. Composition of matter comprising a terpene-peroxide in solution of a liquid chlorinated hydrocarbon which is colored by the content of a fat-soluble dyestuff capable of absorbing the chemically active light, which solution is practically stable to light.

7. Composition of matter comprising a terpene-oxide in solution of a liquid chlorinated hydrocarbon which is colored by the content of a fat-soluble azo-dyestuff capable of absorbing the chemically active light, which solution is practically stable to light.

8. Composition of matter comprising a terpene-peroxide in solution of a halogenated methane which is colored by the content of a fat-soluble azo-dyestuff capable of absorbing the chemically active light, which solution is practically stable to light.

9. Composition of matter comprising a terpene-peroxide in solution of a chlorinated methane which is colored by the content of a fat-soluble azo-dyestuff capable of absorbing the chemically active light, which solution is practically stable to light.

10. Composition of matter comprising a terpene-peroxide in solution of a halogenated methane which is colored by a fat-soluble yellow to red azo-dyestuff capable of absorbing the chemically active light, which solution is practically stable to light.

11. Composition of matter comprising a terpene-peroxide in solution of a chlorinated methane which is colored by a fat-soluble yellow to red azo-dyestuff capable of absorbing the chemically active light, which solution is practically stable to light.

12. Composition of matter comprising ascaridol in solution of a halogenated hydrocarbon which is colored by the content of a fat-soluble dyestuff capable of absorbing the chemically active light, which solution is practically stable to light.

13. Composition of matter comprising ascaridol in solution of a halogenated hydrocarbon which is colored by the content of a fat-soluble azo-dyestuff capable of absorbing the chemically active light, which solution is practically stable to light.

14. Composition of matter comprising ascaridol in solution of a chlorinated hydrocarbon which is colored by the content of a fat-soluble dyestuff capable of absorbing the chemically active light, which solution is practically stable to light.

15. Composition of matter comprising ascaridol in solution of a halogenated methane which is colored by a fat-soluble yellow to red azo-dyestuff capable of absorbing the chemically active light, which solution is practically stable to light.

16. Composition of matter comprising ascaridol in solution of a chlorinated methane which is colored by a fat-soluble yellow to red azo-dyestuff capable of absorbing the chemically active light, which solution is practically stable to light.

17. Composition of matter comprising ascaridol in solution of carbon tetrachloride, which solution is colored by the content of a small percentage of the azo-dyestuff from ortho-anisidine and beta-naphthol.

18. Composition of matter comprising about 10 parts by weight of ascaridol, 90 parts by weight of carbon tetrachloride and about 0.5 part by weight of the azo-dyestuff from ortho-anisidine and beta-naphthol.

STANISLAUS DEICHSEL.